April 14, 1931. H. RIKLI-KEHLSTADT 1,800,644
EXPOSURE METER FOR PHOTOGRAPHIC PURPOSES
Filed Oct. 24, 1927 2 Sheets-Sheet 1
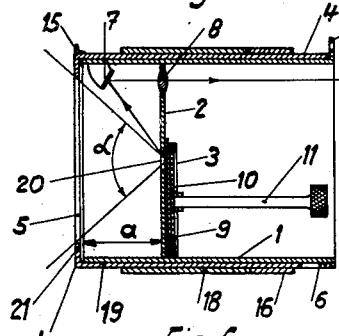
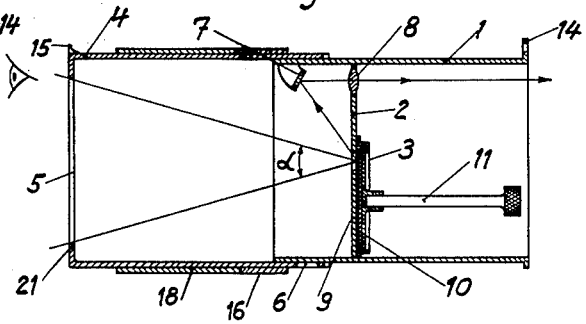
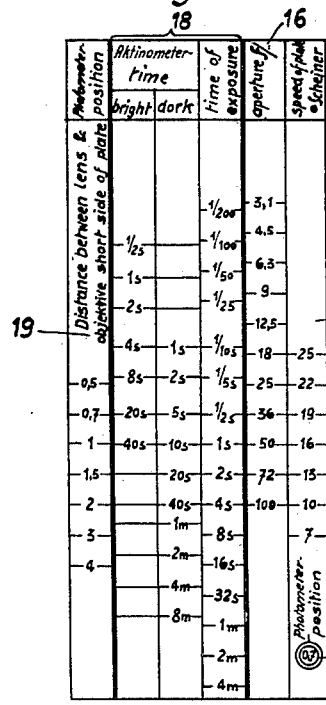
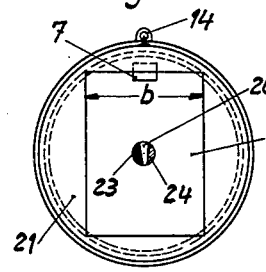
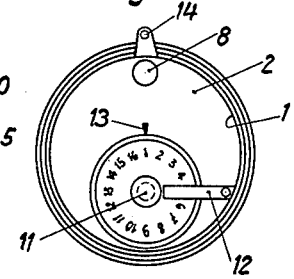
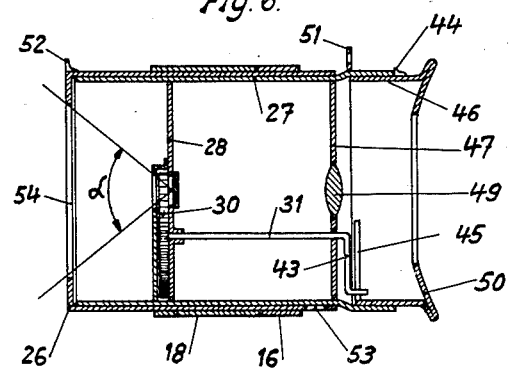
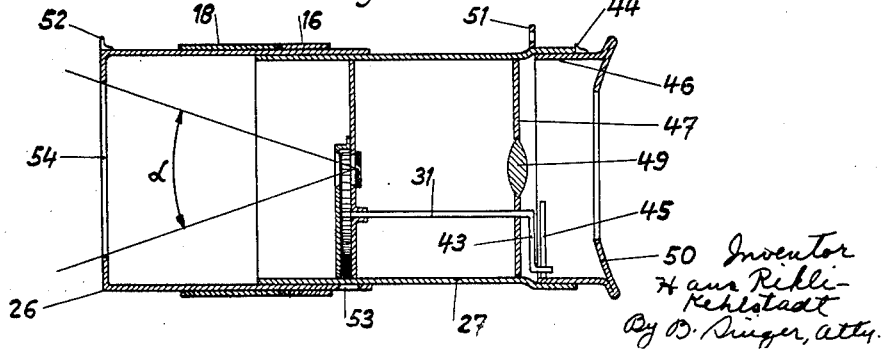

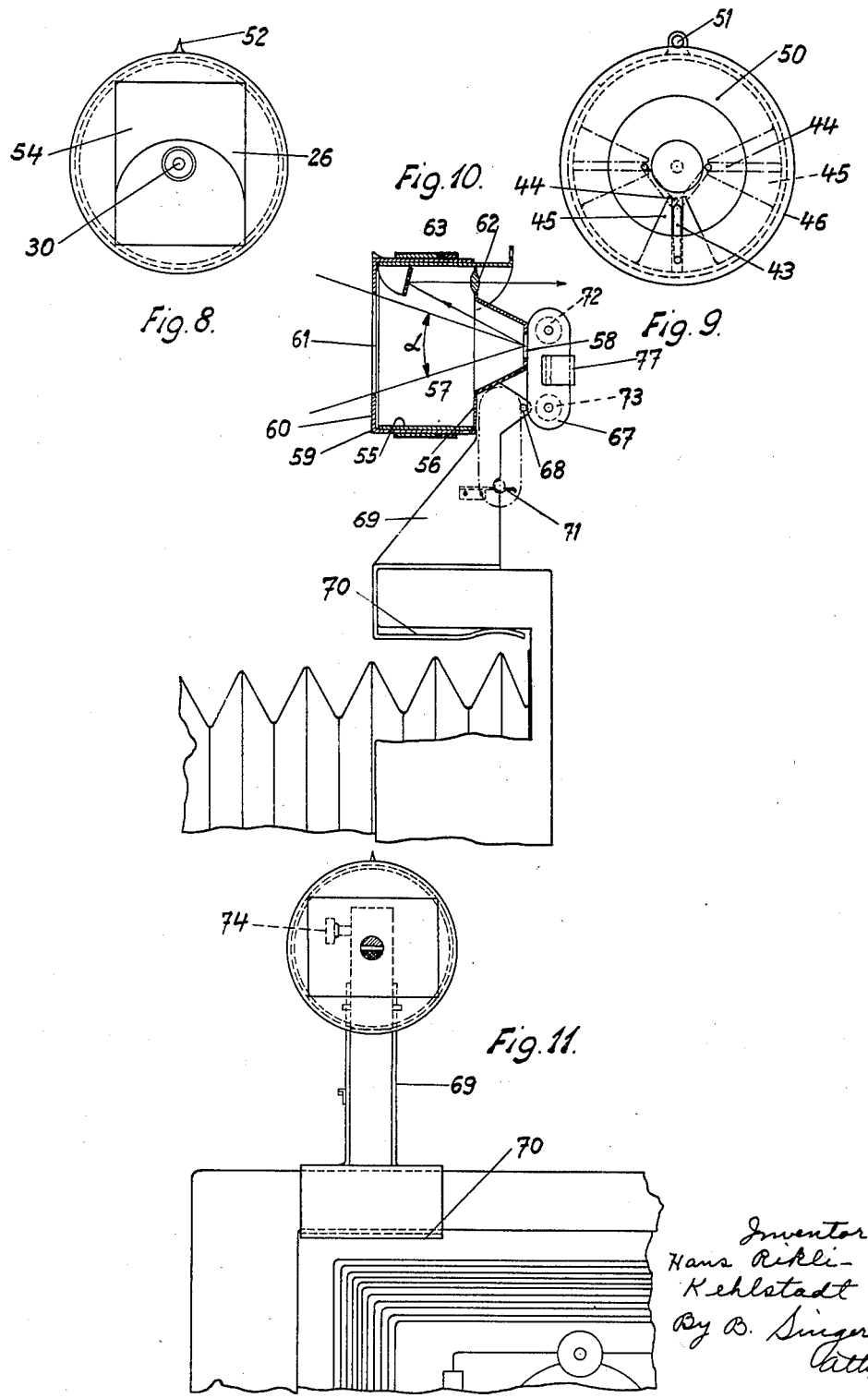

Patented Apr. 14, 1931

1,800,644

UNITED STATES PATENT OFFICE

HANS RIKLI-KEHLSTADT, OF ZURICH, SWITZERLAND

EXPOSURE METER FOR PHOTOGRAPHIC PURPOSES

Application filed October 24, 1927, Serial No. 228,367, and in Germany October 29, 1926.

The present invention relates to a new and improved exposure meter for photographic purposes.

The primary object of the invention is to provide a simple device by means of which an accurate indication of the brightness of the object to be photographed may be obtained.

A further object of the invention consists in the provision of a device which while measuring the intensity of light reflected by or emanating from the object to be photographed gives the exact time for exposure for different types of plates.

A still further object is to provide a combined view finder and exposure meter.

With these and other objects in view my invention consists in certain novel parts and combinations of parts, all of which will be described hereinafter pointed out in the claims and illustrated in the accompanying drawings in which Figs. 1 and 2 show an actinic testing device each in a sectional elevation; the device being shown in two different operative positions.

Figs. 3 and 4 are front and rear end views respectively of the device;

Fig. 5 illustrates scales marked on the outer tube of the device which is to be used in reading-off the time of exposure;

Figs. 6 and 7 illustrate an optical testing device, the latter being shown in sectional elevation in two different operative positions;

Figs. 8 and 9 are a front and rear end view respectively;

Fig. 10 is a sectional side elevation of a combined view finder and exposure meter;

Fig. 11 is a face view thereof.

The device shown in Figs. 1 to 4 comprises a tube 1, having a partition wall 2. At the centre of the wall 2 a hole 20 is provided and behind said wall an actinic testing device 3 itself known is arranged. The device 3 comprises a piece 9 of sensitive paper for instance silver bromide paper. On the tube 1 a sleeve 4 is slidably arranged adapted to be adjusted on tube 1. The sleeve 4 is provided with a front wall 21 having an aperture 5 which corresponds in configuration, position and size to the photograph to be made. By adjusting the sleeve 4 on tube 1 to agree with the position of the objective with reference to the ground plate of the camera the angle $\alpha$ at which the converging bundle of rays, emanating from the object to be photographed passes on to the testing device may be made equal to the photographic picture angle.

This can be arrived at by the following measures. The proportion $\frac{a}{b}$ of the distance $a$ between the aperture of light and the testing device to the short side $b$ of the above aperture is to be made equal—by corresponding displacement of the sleeve 4—to the proportion $\frac{c}{d}$ of the focus $c$ of the applicated objective to the short side $d$ of the applicated photographic plate. Within the tube 1 a small mirror 7 set at a suitable angle to the axis of the tube 1 is arranged which allows the observer to see the image of the testing device through the centre hole 20 by means of a magnifying lens 8 mounted in the wall 2. The testing device comprises two tinted gauge pieces 23, 24 of slightly different shade which pieces cover part of the hole 20, the centre of the hole 20 being covered by a piece 9 of sensitive paper. Adjacent to the wall 2 a round disc 10 is rotatably mounted in suitable guides. The disc 10 is provided with a shaft 11 with a knob ending near the front edge of tube 1. On the disc 10, on the face adjacent the wall 2 the piece 9 of sensitive paper is fixed. At its back, the disc 10 is provided with a circular row of numbers arranged along the periphery of the disc 10, adapted to register with an index point 13 to facilitate the readings of the adjustment of said disc. A blade spring 12 retains the plate 10 in its position on the wall 2. By means of a sighting device 14, 15 of known construction the aperture 5 of the device is pointed towards the object which is to be the subject matter of the photograph.

To determine the correct time for exposure by paying due regard to the speed of the plates used the aperture of the camera and the photographic picture angle, scales are arranged on the mantle of the sleeve 4, the graduations being shown in Fig. 5. The aperture numbers are marked on a ring 16 rotatably mounted on the sleeve 4. Beside the ring 16 a row 17 of figures denoting the speed of the plates used for instance in degrees Scheiner are arranged. Adjacent ring 16, a second ring 18 is rotatably mounted on the sleeve 4 having a time scale. Along the edge of the ring 18 there is a graduation 19 giving the ratio $\frac{c}{d}$ that is the distance of the objective from the ground plate of the camera divided by the length of the small side of the plate. The inspection of the sensitive paper may take place indirectly by means of the mirror 7 which allows the observer to see the image of the testing device parts 23, 24, 9 through the lens 8 in the partition wall 2. For carefully examining the mirror 7 may be constructed in the form of a concave mirror. The time necessary for the sensitive paper 9 to assume the shade of one of the pieces 23, 24 is ascertained by a stop watch, by counting up to a certain number found by trial, etc. etc.

By adjusting the tubular members 1 and 4 the angle at which the light rays proceeding from the object are incident upon this testing device 3 can be made equal to the photographic picture angle. The time of exposure required by the silver bromide paper before it attains the comparison tint thus provides an accurate indication of the average brightness value of the object and also of the necessarily exact time for exposure which may be calculated from it with reference to the exposure meter constant, the speed of the plate and the aperture of the shutter. Light rays which do not emanate from the object to be photographed but from the surroundings of same are with this exposure meter kept away from its testing device 3, cannot thus effect the time to be measured.

The device is used as follows:

If plates are used of a speed equal to 13° Scheiner's scale, ring 16 is rotated until the value $f/50$ is in registery with the number 13 of scale 17. The relation $$\frac{a}{b} \text{ or } \frac{c}{d}$$

is given as 2. Now the ring 18 is rotated until the time observed by the actinometer for instance 40 seconds bright tint registers with the number 2 of scale 19 and now the time of exposure may be read off the scale running along the right hand edge of ring 18 for any desired aperture for instance for $f/50$, two seconds; for $f/9$, 1/15 second and so on.

The time of exposure depends on the speed of the sensitive paper. The constants of the device that is the relative position of the scales 17 and 19 are valid only for a given speed of the paper.

An exposure meter constructed according to the principle described always measures the correct average actinically operating brightness of the object to the photographed independently of whether it is surrounded by dark objects (high trees, houses, etc.) or by light objects (bright clouds, clear sky, snowfields, etc.).

The opening 5 by which the light enters the exposure meter is similar in shape to the photograph and proportioned and positioned similarly to this, thus a rectangle of 2,6 x 3,6 cm. is used as an opening 5 with a plate size 13 x 18 cm. for example, with the result that the above conditions are correctly fulfilled with the proper angle α. The exposure meter can be used for different picture angles (for example when photographing very close or distant objects, different ground-glass positions with the same lens or different plate sizes with the same lens or when employing lenses of different focal length) as the angle of incidence α of the light rays may be rendered adjustable and employment of the picture angle used at the time made possible owing to the telescopic construction of the exposure meter.

In Figs. 6 to 9 an optically operated exposure meter is shown the position of the parts being shown for the largest and the smallest angle α. The device comprises a sleeve 26 slidably mounted on a tubular member 27. The tube 27 is provided with a partition wall 28 on which the testing device is mounted. The testing device is of known construction it comprises a circular disc 30 of glass or other transparent material and is tinted along its periphery from light to dark. The disc 30 is fixed on a shaft 31 having a crank 43 which engages a radial slot 44 of a plate 45 rigidly fixed to an eye piece 46. The eye piece 46 is rotatably mounted in an extension 48 of the tube 27. The shaft 31 is journalled in a wall 47 of the member 27 in which a magnifying lens 49 is mounted by which the lighted area of the testing disc 30 may be observed. By turning the eye piece 46 the disc 30 is turned to and the position of the disc 30 may be read off a scale arranged on the mantle of the eye piece 46 by means of an index 44 fixed to said extension. The eye piece is provided with inwardly projecting shades 50 by which the light may be shut off while the observer uses the device.

The device comprises moreover a sighting device 51, 52 of known construction and the sleeve 26 is provided with a window 53 playing over a scale marked on the tube 27. The scale gives the values $$\frac{a}{b} \text{ or } \frac{c}{d}$$

as explained with reference to Figs. 1 to 5. The area of the disc 30 exposed to the light is comparatively very small with reference to the aperture 54 in the front wall of the sleeve 26. The aperture 54 itself corresponds and is proportional to the aperture of the camera and conforms in position and configuration thereto.

In using the device it will be necessary to view the object for some time for instance for ½ minute to give the eye of the observer sufficient time to accommodate itself.

The position of the eye piece that is the position of the disc 30 in conjunction with readings through the window 53 gives a measure of the quantity of light available and the time of exposure may be found by the scale as described with reference to the actinic device shown in Figs. 1 to 5 which scales may be arranged on the sleeve 26.

The means to rotate the disc 30 might be used to turn the disc 10 in the device as shown in Figs. 1 to 5 in which case the lens is displaced radially in line with the mirror.

The exposure meter may be combined with a view finder and may advantageously be used with hand cameras (Kodak cameras). The exposure meter as shown in Figs. 10 and 11 comprises a casing 55 having at the rear wall 56 a recess 57 with a window 58 behind which the actinic testing device may be mounted. On the casing 55 a sleeve 59 is slidably arranged having a wall 60 with a window 61 which corresponds in size, and position to the aperture of the camera.

On the rear wall 56 a lens 62 is mounted and within the casing 55 a small mirror 63 is arranged which is set in such a position that the image of the opening 58 of the recess 57 may be observed by means of the lens 62. The testing device proper comprises a casing 67 pivoted at 68 to the support 69 of the casing 55. The said support 69 is provided with a springy clamp 70 by means of which the view finder and exposure meter may be attached to a wall of the casing of the camera. The casing 70 may be brought in the position shown in dotted lines, Fig. 10, and is secured in this position by a spring 71 fixed to the support 69 with one end and retaining a pin 72 of the casing 70 with its other end. The casing 70 is held in the operative position of the device by means of a snap lock (not shown in the drawings) of known construction. In the casing 70 two spools 72, 73 are rotatably mounted on which the ends of a band of sensitive paper are fixed. One of said spools is provided with a knob 74 by means of which the band may be drawn from one of the spools and wound on the other spool. The casing 67 is provided at one side wall with a window which is in registry with the opening 58 of casing 55. The bi-partite casing 67 is held closed by a springy yoke 77.

The device is arranged in the camera in such a manner that the axis of the device is parallel to the axis of the camera.

The time of exposure is ascertained by means of the scales described with reference to the device shown in Figs. 1 to 5 the said scales may be arranged on the sleeve 59.

If the time of exposure is ascertained the casing 70 is swung down in the position shown by dotted lines and the casing 55, etc., is now ready to be used as a view finder. The object or objects to be photographed appear to the eye as seen through the opening 61 of sleeve 59 at the same angle α which has been previously ascertained by measuring the light.

From the foregoing it will readily be seen, that I have provided a cheap durable and efficient device which may be readily accommodated to any of the standard cameras and which will reproduce in measuring the time of exposure the conditions prevailing in the use of the camera. While I have shown the preferred form of my invention I do not limit myself thereto but would have it understood that various changes may be made without departing from the spirit of the invention.

What I claim by U. S. Letters Patent is:—

1. A photographic exposure meter comprising in combination a tubular member with a partition wall having an opening in its centre, a sleeve slidably mounted on said tubular member, and having a front wall which is provided with an aperture for light and corresponding in configuration and position to the photograph to be made, the proportion of the short side of said aperture to the distance of the aperture from the opening in the center of said partition wall containing the testing device being made, by suitable position of the said slidably mounted sleeve, the same as the proportion of the short side of the applicated photographic plate to the distance of this plate from the centre of the photographic objective, means mounted within said tubular member adapted to measure the light emanating from the object to be photographed.

2. A photographic exposure meter comprising in combination a tubular member, a sleeve slidably mounted on said tubular member, a front wall on said sleeve, an aperture in said front wall, a partition wall in said tubular member, an opening in said partition wall, a rotary disk mounted in front of said opening material sensitive to light on said disk at least one tinted gauge piece, covering part of said opening, means to rotate said disk and graduations to assist in the calculating of the time of exposure.

3. A photographic exposure meter comprising in combination a tubular member, a sleeve slidably mounted on said tubular member, a front wall on said sleeve, an aperture in said front wall, a partition wall in said tubular member, an opening in said partition wall, a rotary disk mounted in front of said opening material sensitive to light on said disk at least one tinted gauge piece, covering part of said opening, means to rotate said disk, the opening of said front wall of the sleeve corresponding in size, configuration and position to the photograph to be made.

4. A photographic exposure meter comprising in combination a tubular member, a sleeve mounted on said tubular member, a front wall on said sleeve, an aperture in said front wall, a partition wall in said tubular member, an opening in said partition wall, a rotary disk mounted in front of said opening material sensitive to light on said disk at least one tinted gauge piece, covering part of said opening, an eye piece rotatably mounted on said tubular member, a crank mechanism to rotate said disk by said eye piece.

5. A photographic exposure meter comprising in combination a tubular member, a sleeve slidably mounted on said tubular member, a front wall on said sleeve, an aperture in said front wall, a partition wall in said tubular member, an opening in said partition wall, a rotary disk mounted in front of said opening material sensitive to light on said disk at least one tinted gauge piece, covering part of said opening, means to rotate said disk, a mirror arranged within the said tubular member, a lens opposite said mirror and graduations to aid in calculating the time of exposure.

6. A photographic exposure meter comprising in combination a tubular member, a sleeve slidably mounted on said tubular member, a front wall on said sleeve, an aperture in said front wall, a partition wall in said tubular member, an opening in said partition wall, a rotary disk mounted in front of said opening material sensitive to light on said disk at least one tinted gauge piece, covering part of said opening, means to rotate said disk a mirror arranged within the said tubular member, a lens opposite said mirror, a sighting device mounted on said sleeve and scales to aid in determining the time of exposure.

7. A photographic exposure meter comprising in combination a tubular member, a sleeve slidably mounted on said tubular member, a front wall on said sleeve, an aperture in said front wall, a partition wall in said tubular member, an opening in said partition wall, a rotary disk mounted in front of said opening material sensitive to light on said disk at least one tinted gauge piece, covering part of said opening, means to rotate said disk a mirror arranged within the said tubular member, a lens opposite said mirror, a sighting device mounted on said sleeve and scales to aid in determining the time of exposure, some of said scales being on rings rotatably mounted on the sleeve some on the mantle of said sleeve adjacent said rings.

8. A photographic exposure meter comprising, in combination, a tubular member, a sleeve slidably mounted on said tubular member and having a front wall provided with an aperture for the incoming light and which aperture corresponds in configuration and position of axis to the photograph to be made and has such a position relative to the testing device that only the light rays emanating from the object to be photographed arrive to the testing device, said testing device, which measures the quantity of light arriving to it, comprising tinted gauge pieces and a renewable piece of sensitive paper.

9. A photographic exposure meter adapted with parallel optical axis to the camera used and comprising in combination a tubular member, a sleeve slidably mounted on said tubular member and having a front wall on said sleeve provided with an aperture for the incoming light, which corresponds in configuration and position of axis to the photograph to be made and which has such a position relative to the testing device that only the light rays emanating from the object to be photographed arrive to the testing device substantially as described in claim 1, and in which the testing device is movably mounted so that it can easily be displaced and so that the observer's eye may take the place thereof and be enabled to see the object to be photographed just with the same picture angle as that of the prior light on the testing device.

10. A photographic exposure meter comprising a tubular member having a partition wall provided with a central opening and a testing device in said opening, a sleeve slidably mounted on said tubular member and having a front wall provided with an aperture for the incoming light, which aperture corresponds in configuration and position of axis to the photograph to be made and which has such a position relative to the testing device that only the light rays emanating from the object to be photographed arrive to the said testing device, that is, that the enclosing angle of the incoming bundle of light rays is equal to the picture angle of the photograph to be made, which can be arrived at by making the proportion between the short side of said aperture to the distance of this aperture from the said opening in the center of the partition wall containing the testing device equal to the proportion between the short side of the applicated photographic plate to the distance of this plate from the center of the objective.

In witness whereof I affix my signature.

HANS RIKLI-KEHLSTADT.